(12) United States Patent
Okamoto et al.

(10) Patent No.: US 10,000,649 B2
(45) Date of Patent: Jun. 19, 2018

(54) ACTIVE ENERGY RAY-CURABLE INKJET INK COMPOSITION

(71) Applicants: TOYO INK SC HOLDINGS CO., LTD., Tokyo (JP); TOYO INK CO., LTD., Tokyo (JP)

(72) Inventors: Mayuko Okamoto, Tokyo (JP); Yuji Kameyama, Tokyo (JP); Kazuhiro Jonai, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 0 days. days.

(21) Appl. No.: 15/125,583

(22) PCT Filed: Mar. 14, 2014

(86) PCT No.: PCT/JP2014/056934
§ 371 (c)(1),
(2) Date: Sep. 13, 2016

(87) PCT Pub. No.: WO2015/136694
PCT Pub. Date: Sep. 17, 2015

(65) Prior Publication Data
US 2017/0002218 A1    Jan. 5, 2017

(51) Int. Cl.
*C08F 2/46* (2006.01)
*C08F 2/50* (2006.01)
*C08G 61/04* (2006.01)
*C09D 11/322* (2014.01)
*C09D 11/40* (2014.01)
*C09D 11/107* (2014.01)

(52) U.S. Cl.
CPC .......... *C09D 11/322* (2013.01); *C09D 11/107* (2013.01); *C09D 11/40* (2013.01)

(58) Field of Classification Search
CPC ...... C09D 11/322; C09D 11/107; C09D 11/40
USPC ....................... 522/71, 1, 189, 184, 6; 520/1
See application file for complete search history.

(56) References Cited

U.S. PATENT DOCUMENTS

| | | | |
|---|---|---|---|
| 2009/0227733 A1 | 9/2009 | Miura | |
| 2010/0330296 A1* | 12/2010 | Loccufier | C09D 11/101 427/511 |
| 2011/0124768 A1* | 5/2011 | Claes | C09D 11/101 522/182 |
| 2011/0195198 A1 | 8/2011 | Loccufier et al. | |
| 2012/0189822 A1 | 7/2012 | Ito et al. | |
| 2012/0194616 A1 | 8/2012 | Van Dyck et al. | |
| 2012/0252919 A1* | 10/2012 | Suzuki | C09D 11/101 522/8 |
| 2012/0274717 A1* | 11/2012 | Nakano | C09D 11/101 347/102 |
| 2013/0050367 A1 | 2/2013 | Hoogmartens | |
| 2013/0286121 A1* | 10/2013 | Fukumoto | B41J 2/01 347/102 |
| 2013/0303682 A1 | 11/2013 | Konda et al. | |
| 2014/0292962 A1* | 10/2014 | Nakano | B41J 2/175 347/89 |

FOREIGN PATENT DOCUMENTS

| | | |
|---|---|---|
| EP | 2505624 | 10/2012 |
| EP | 2586838 | 5/2013 |
| EP | 2650338 | 10/2013 |
| JP | 2009-235380 | 10/2009 |
| JP | 2011-502188 | 1/2011 |
| JP | 2012-502131 | 1/2012 |
| JP | 2012-149206 | 8/2012 |
| JP | 2012-219255 | * 11/2012 |
| JP | 2013-023630 | * 2/2013 |
| JP | 2013-177525 | 9/2013 |
| JP | 2013-216784 | 10/2013 |
| JP | 2013-240979 | * 12/2013 |
| JP | 2013-245241 | * 12/2013 |
| WO | 2011039081 | 4/2011 |
| WO | 2011160954 | 12/2011 |

OTHER PUBLICATIONS

Nakane et al, JP 2012-219255 Machine Translation, Nov. 12, 2012.*
Yurugi, JP 2013-023630 Part 1 Machine Translation, Feb. 4, 2013.*
Yurugi, JP 2013-023630 Part 2 Machine Translation, Feb. 4, 2013.*
Okamoto et al, JP 2013-245241 Machine Translation, Dec. 9, 2013.*
Fukumoto et al, JP 2013-240979 Part 1 Machine Translation, Dec. 5, 2013.*
Fukumoto et al, JP 2013-240979 Part 2 Machine Translation, Dec. 5, 2013.*
"International Preliminary Report on Patentability; this report contains the following items :Form PCT/IB/338, PCT/IB/373, PCT/ISA237(cover sheet), PCT/ISA237(Box No. I),PCT/ISA237(Box no. V)", dated Oct. 4, 2016, which is English translation of "Written Opinion of the International Searching Authority", p. 1-p. 6.
"International Search Report (Form PCT/ISA/210)", dated Dec. 9, 2014, with English translation thereof, pp. 1-4.
Official Action dated Jan. 5, 2016 in related Japanese Patent Application No. 2012-216734, with English translation thereof, pp. 1-5.
"Search Report of Europe Counterpart Application", dated Aug. 18, 2017, p. 1-p. 7.

* cited by examiner

*Primary Examiner* — Jessica Whiteley
(74) *Attorney, Agent, or Firm* — JCIPRNET

(57) ABSTRACT

The disclosure relates to an active energy ray-curable inkjet ink composition comprising at least a monomer and a pigment, wherein the monomer comprises at least 2-(2-vinyloxyethoxy)ethyl acrylate and dipropylene glycol diacrylate. A content of 2-(2-vinyloxyethoxy)ethyl acrylate is 36 to 65% by weight in a total weight of the ink. A content of dipropylene glycol diacrylate is 31 to 63% by weight in the total weight of the ink. A content of the pigment is 1 to c % by weight in the total weight of the ink, wherein the c is the pigment concentration at which the average absorbance at 320-380 nm in 2,000-fold dilution of the ink composition with dipropylene glycol diacrylate is 1.

10 Claims, No Drawings

ACTIVE ENERGY RAY-CURABLE INKJET INK COMPOSITION

CROSS-REFERENCE TO RELATED APPLICATION

This application is a 371 application of the international PCT application ser. no. PCT/JP2014/056934, filed on Mar. 14, 2014. The entirety of the above-mentioned patent application is hereby incorporated by reference herein and made a part of this specification.

TECHNICAL FIELD

The present invention relates to an active energy ray-curable inkjet ink composition. More specifically, the present invention relates to provision of, particularly, a single-pass curable ink which has low viscosity, excellent color reproducibility, while being reduced in the amounts of remaining components in a cured film, and which is able to be used in various applications such as labels for food and cosmetics.

BACKGROUND ART

In the past, active energy ray-curable inkjet inks are, in comparison with those of solvent type, mounted on signage printers of high-speed printing type due to its quickness of drying, and on flat bed printers for various base materials due to its marked adhesion to the base materials, and its recipes according to the use are under development.

These printers cope with the increase of size, thickness, and density by scanning the head. In recent years, with the advances in head technologies, the head technique allowing ejection of microscopic droplets at a high frequency has been established. Owing to this achievement of the technique, the possibility of replacement of the existing printing system with inkjet printing, which has been inferior in productivity and image quality has increased, accompanied with the merit of digitization. Furthermore, the advent of a single-pass printer, which simultaneously cures the inks ejected from at least two or more inkjet heads, has allowed the cost reduction and enhancement of productivity of the apparatus, and is accelerating the replacement of the existing printing system.

The conversion from the existing printing to inkjet printing is spreading in many fields, because it matches with the recent business model concerning provision of various products in small lots for responding to diversified consumer needs. Especially for label printing, if the application to the volume zone such as food, cosmetics, and pharmaceutical products, is allowed, variable data for each product can be attached to the label, and manufacturers can provide safety and security to consumers at a lower cost.

However, the achievement of this technological innovation required the development of ink having higher sensitivity to active energy rays than the existing ink. High sensitivity contributes to the improvement of printing speed, and is required of inks for the enhancement of productivity.

In addition, improvement of color reproducibility is required for the replacement of prior art offset printing with inkjet printing. Especially in the fields of food, cosmetics, and pharmaceutical products, the sales of products are markedly influenced by the attractiveness of the presentation of the content by the label. Therefore, color reproducibility can be one of important quality factors. However, especially for active energy ray-curable inkjet inks, it is very difficult to satisfy all the demanded properties such as color reproducibility of images, curability, and ejection stability.

If the application amount of the ink composition is increased for achieving a wide range of color reproducibility, the image to be produced is mat and unsuitable for the labels of food, cosmetics, and pharmaceutical products. In addition, if the pigment concentration in the ink composition is increased for achieving a wide range of color reproducibility, the ink composition is thickened, and the inside of the coating film will not be cured, and the residual components in the cured film can invade into food, cosmetics, and pharmaceutical products to cause problems.

Especially in an active energy ray-curable inkjet ink, the ink materials contain odorous matter and harmful components to human body. If these raw material components of the ink remain in the cured film as residue and it invade into the content such as food, cosmetics, and pharmaceutical products, serious problems can occur. In order to prevent invasion of the residue into the content, it is most effective to reduce the residual component amount in the cured film. In other words, a wide range of color reproducibility and reduction of residual components in the cured film are important factors for the use of an active energy ray-curable inkjet ink for labels for food, cosmetics, and pharmaceutical products.

The residual component amount in the cured film can be grasped by immersing the cured film in a highly soluble solvent such as methyl ethyl ketone, and determining the amount of components eluted in the solvent. The use of this criterion allows more accurate measurement of residual component amount in the cured film than the existing measurement method described in Literature 2 wherein the cured film is warmed, and the amount of volatilized components is determined. Therefore, safety is guaranteed and usable for the pharmaceutical products and other applications wherein the invasion of ink components into the product is more strictly limited.

For these problems, in the past, discharge of residual components from the cured film to the outside is prevented by the use of high molecular weight compounds without the use of low molecular weight compounds. However, these high molecular weight compounds increase the ink viscosity, and cannot be abundantly used in inkjet inks required to have a low viscosity for ejection. Furthermore, it was found that high molecular weight compounds have low reactivity, so that remain in the cured film in the form of unreacted components, and can be eluted by methyl ethyl ketone.

Literature 1 suggests a new initiator useful for food applications. However, when an ink containing a pigment 1% by weight or more is prepared by this method, curing is insufficient, and the residual component ratios in the cured film were found to be high; 0.5% or more for the monomers, and more than 6% for the initiator when eluted with methyl ethyl ketone. Therefore, this method cannot be used for labels for food and pharmaceutical products.

Literature 2 suggests the method of providing an ink for packaging toys and food. However, this method requires nitrogen charging during ultraviolet ray curing, which can result in a very high running cost. In addition, the conveyor speed is 10 m/min, and the productivity is very low. Furthermore, if an ink containing a pigment in the ratio of 1% by weight or more is prepared by this method, ejection stability is poor, and high-definition images cannot be made by high-speed continuous printing. In addition, curing is insufficient, and the residual component ratios in the cured film when eluted with methyl ethyl ketone were found to be 0.5% or more for the monomers, and more than 6% for the initiator. Therefore, this method cannot be used for labels for food and pharmaceutical products supporting high-speed printing without any change.

Literature 3 suggests a method of providing an ink containing 2-(2-vinyloxyethoxy)ethyl acrylate as an ink having good curability. However, under this method, the reaction from the initiator to the monomer is hard to proceed, so that curing of the monomer is insufficient. In the ink containing a pigment in the ratio of 1% by weight or more, the residual component ratios in the cured film when eluted with methyl ethyl ketone were found to be 0.5% or more for the monomers, and more than 6% for the initiator.

Literature 4 discloses an active energy ray curable composition having high storage stability while maintaining curability. In addition, Literature 5 discloses an active energy ray-curable inkjet ink set, the ink set giving high quality images especially with a single-pass printer, and having high quality stability after storage by adjusting the blending quantity of the surface tension regulator. Literature 6 discloses an inkjet recording method which is superior in curability, ejection stability, and suppression of temperature rise in the recording apparatus after continuous printing. Either Literatures disclose an active energy ray-curable ink composition using 2-(2-vinyloxyethoxy)ethyl acrylate and dipropylene glycol diacrylate as monomers, but curing is insufficient, and the residual component ratios when eluted with methyl ethyl ketone in the cured film are 0.5% or more for the monomers, and more than 6% for the initiator. Therefore, these inks are not sufficiently safe for the labels for food, cosmetics, and pharmaceutical products, and cannot provide high quality images by high-speed printing.

PRIOR ART DOCUMENTS

Patent Documents

Patent Literature 1: PCT Japanese Translation Patent Publication No. 2012-502131
Patent Literature 2: PCT Japanese Translation Patent Publication No. 2011-502188
Patent Literature 3: Japanese Unexamined Patent Application Publication No. 2013-177525
Patent Literature 4: Japanese Unexamined Patent Application Publication No. 2013-023630
Patent Literature 5: Japanese Unexamined Patent Application Publication No. 2013-216784
Patent Literature 6: Japanese Unexamined Patent Application Publication No. 2013-240979

SUMMARY OF THE INVENTION

Problems to be Solved by the Invention

The present invention is intended to provide an ink which has a low viscosity, excellent color reproducibility, while being reduced in the amounts of remaining components in a cured film, thereby providing a printed material by digital printing at high productivity and low cost, the printed material having a low residual component amount in the cured film which is able to be used for various applications such as labels for food, cosmetics, and pharmaceutical products.

Means to Solve the Problems

That is, the present invention relates to an active energy ray-curable inkjet ink composition including at least a monomer and a pigment, wherein the monomer includes at least 2-(2-vinyloxyethoxy)ethyl acrylate and dipropylene glycol diacrylate, a content of 2-(2-vinyloxyethoxy)ethyl acrylate is 36 to 65% by weight in a total weight of the ink, a content of dipropylene glycol diacrylate is 31 to 63% by weight in the total weight of the ink, and a content of the pigment is 1 to c % by weight in the total weight of the ink, wherein the c is the pigment concentration at which the average absorbance at 320-380 nm in 2,000-fold dilution of the ink composition with dipropylene glycol diacrylate is 1.

The present invention relates to the active energy ray-curable inkjet ink composition, further including at least one initiator having a maximum absorbance at 320 to 380 nm.

In addition, the present invention relates to the active energy ray-curable inkjet ink composition, wherein an amount of the initiator is 10% by weight or less in the total weight of the ink.

In addition, the present invention relates to the active energy ray-curable inkjet ink composition, wherein a content of a monomer having at least one of an ethylene oxide skeleton and a propylene oxide skeleton is 90% by weight or more in the total amount of the monomer.

In addition, the present invention relates to the active energy ray-curable inkjet ink composition, which is a single-pass curable active energy ray-curable inkjet ink composition.

In addition, the present invention relates to the active energy ray-curable inkjet ink composition, which is an ink composition of cyan, magenta, yellow, or black.

In addition, the present invention relates to the active energy ray-curable inkjet ink composition, which is an ink composition of cyan, magenta, yellow, or black, wherein c is 2.9 for the cyan, 8.6 for the magenta, 7.5 for the yellow, and 2.7 for the black.

In addition, the present invention relates to an ink set including at least one of ink compositions of cyan, magenta, yellow, and black, wherein the at least one of the ink compositions are the active energy ray-curable inkjet ink composition.

In addition, the present invention relates to the ink set, wherein the cyan ink composition includes a pigment selected from the group consisting of C.I. Pigment Blue 15:3, C.I. Pigment Blue 15:4, and C.I. Pigment Blue 15:6, the magenta ink composition includes a pigment selected from the group consisting of C.I. Pigment Red 122, C.I. Pigment Red 184, C.I. Pigment Red 185, C.I. Pigment Red 202, C.I. Pigment Red 208, C.I. Pigment Red 245, and C.I. Pigment violet 19, the yellow ink composition includes a pigment selected from the group consisting of C.I. Pigment Yellow 74, C.I. Pigment Yellow 120, C.I. Pigment Yellow 138, C.I. Pigment Yellow 139, C.I. Pigment Yellow 150, C.I. Pigment Yellow 151, C.I. Pigment Yellow 155, C.I. Pigment Yellow 180, C.I. Pigment Yellow 185, and C.I. Pigment Yellow 213, and the black ink composition includes C.I. Pigment Black 7.

Effects of the Invention

The active energy ray-curable inkjet ink composition of the present invention provides an ink which has low viscosity and excellent color reproducibility, while being reduced in the amounts of remaining components in a cured film, especially unreacted low molecular weight components emitting odor, thereby providing a digital printed material, which is able to be used in various applications such as labels for food, cosmetics, and pharmaceutical products, with high productivity and at a low cost.

(Active Energy Ray-Curable Inkjet Ink Composition)

The active energy ray-curable inkjet ink composition of the present invention (may be referred simply to as ink) includes a pigment and specific monomers.

The active energy rays in the present invention is the general name of ionizing radiation and light, such as electron beams, α rays, γ rays, X rays, and neutron rays, or ultraviolet rays. Among them, electron beams and ultraviolet rays are preferred, because they have a low risk to humans, and are easy to handle and widely used in industrial applications.

The ink composition of the present invention is preferably produced by adding a monomer and initiator to the dispersion containing a pigment, a dispersant, and a monomer. The monomer contained in the dispersion and the monomer contained in the ink composition may be identical or different. Alternatively, different two or more monomers may be used in combination. This production method allows sufficient dispersion even when dispersed using an ordinary disperser. Therefore, no excessive dispersion energy will be applied, so that a long dispersion time is not necessary. Accordingly, deterioration during dispersion of the ink components hardly occurs, and thus highly stable ink can be prepared. When making the dispersion, the use of minute beads is preferred. Specifically, the use of minute beads of 0.1 mm to 2 mm is preferred for producing a low-viscosity and stable dispersion. It is more preferred that minute beads of 0.1 mm to 0.5 mm are used, for improving productivity and producing a dispersion having good ejection properties. After dispersion, the ink composition is preferably filtrated through a filter having a pore size of 3 μm or less, more preferably 1 μm or less.

(Monomer)

The monomer defined in the present invention refers to a compound which causes polymerization reaction upon irradiation with an active energy rays, directly or through a photopolymerization initiator.

The inkjet ink composition of the present invention contains 2-(2-vinyloxyethoxy)ethyl acrylate and dipropylene glycol diacrylate, as essential monomer components.

In order to understand the mechanism of persistence of the monomers, initiator and the other in the cured film, firstly, the mechanism of active energy ray curing must be understood. In the active energy ray curing, (1) energy is given to the initiator upon active energy irradiation, whereby the initiator is cleaved to form an active radical, (2) the active radical reacts with monomers without deactivation by oxygen or the like, and then (3) these monomers polymerize, whereby a cured film is formed.

During the formation of the cured film by active energy ray curing, if the consumption of the initiator and monomers (polymerization components) is nonuniform, or a specific initiator or monomers will not react, they can remain in the cured film.

During the formation of the cured film, if a monomer which is slow to react with an active radical, or an initiator or monomer having low flowability is exist in the polymerization reaction, they tend to remain in the cured film.

2-(2-vinyloxyethoxy)ethyl acrylate and dipropylene glycol diacrylate have high molecular flowability in the ink or film during curing. Therefore, they react with the radical generated from the initiator, and extend the molecular chain while incorporating a certain amount of other monomers, and they have property that polymerization proceeds efficiently without inactivation of the radical in midstream. Accordingly, they react with the initiator and monomers at high efficiency, and minimize the residual component in the cured film.

In particular, 2-(2-vinyloxyethoxy)ethyl acrylate has a unique molecular structure composed of an acryloyl group and a vinyl group as hydrophobic groups, and ethylene oxide as a hydrophilic group between the hydrophobic groups, so that it exists in the ink with the hydrophilic groups closed to each other, and with the hydrophobic groups closed to each other. In particular, the molecules of the acryloyl and vinyl groups as reactive groups tend to approach each other in the ink. The reaction between the acryloyl and vinyl groups is very faster than that between acryloyl groups and between the vinyl groups. Therefore, when 2-(2-vinyloxyethoxy)ethyl acrylate received an active radical, polymerization of monomers in the step (3) of the active energy ray curing is proceeded very quickly without suspension, whereby the residual amounts of the initiator and monomers are likely decreased.

In addition, dipropylene glycol diacrylate very quickly reacts with the active radical generated by photocleavage of the initiator, so that deactivation of the active radical by oxygen inhibition is prevented in the step (2) of the active energy ray curing, whereby the residual amounts of the initiator and monomer are likely decreased.

In particular, if the pigment concentration in the ink is 1% by weight or more, the applied active energy is partly absorbed in the pigment, whereby cleavage of the initiator is hindered in the step (1) of the active energy ray curing, and the pigment physically hinders the polymerization reaction of the monomers. Therefore, a method of increasing the reaction points between the active radical and monomers by increasing the initiator amount is suggested. However, if the initiator amount is increased, the initiator amount remaining in the cured film increases, so that the residual component amount in the whole cured film cannot be decreased.

In the present invention, with regard to the ink composition, when 2-(2-vinyloxyethoxy)ethyl acrylate is from 36 to 65% by weight, and dipropylene glycol diacrylate is from 31 to 63% by weight, preferably 2-(2-vinyloxyethoxy)ethyl acrylate is from 36 to 55% by weight, and dipropylene glycol diacrylate is from 31 to 50% by weight, the monomers flow to the initiator in the ink or the film during curing, and start to react with the active radical at a high speed. And, in the reaction, polymerization with extending the molecular chain is proceeded at a high speed while reducing the residual amount of the initiator, and incorporating a certain amount of other monomer into 2-(2-vinyloxyethoxy)ethyl acrylate and dipropylene glycol diacrylate. Therefore, the residual component in the cured film would be minimized even in high-speed printing.

It was found that this phenomenon occurs when 2-(2-vinyloxyethoxy)ethyl acrylate/dipropylene glycol diacrylate=0.5 to 2.0, but will not occur when 2-(2-vinyloxyethoxy)ethyl acrylate and dipropylene glycol diacrylate are present alone, or either of them is present in an excessive amount.

The monomers used in the present invention may be not only 2-(2-vinyloxyethoxy)ethyl acrylate and dipropylene glycol diacrylate, and may be freely selected as long as the purpose will not be hindered. Specific examples include acrylic monomers such as monofunctional acrylic monomers, bifunctional acrylic monomers, and trifunctional or more acrylic monomers, or vinyl monomers, vinyl ether monomers, and heterogeneous monomers having an acryloyl group and a vinyl group in one molecule.

In the present description, "(meth)acrylate" means at least one of an acrylate and a methacrylate corresponding to the acrylate, and "(meth)acryl" means at least one of an acryl and a methacryl corresponding to the acryl.

Specific examples of the monofunctional monomer include benzyl (meth)acrylate, (ethoxylated (or propoxylated)) 2-phenoxyethyl (meth)acrylate, dicyclopentenyl (oxyethyl) (meth)acrylate, phenoxydiethylene glycol (meth) acrylate, 2-methoxyethyl (meth)acrylate, methoxytriethylene glycol (meth)acrylate, 2-ethoxyethyl (meth)acrylate, ethoxyethoxyethyl (meth)acrylate, methoxydipropylene glycol (meth)acrylate, dipropylene glycol (meth)acrylate, β-carboxylethyl (meth)acrylate, trimethylolpropane formal (meth)acrylate, isoamyl (meth)acrylate, cyclohexyl (meth)acrylate, tetrahydrofurfuryl (meth) acrylate, isoboronyl (meth)acrylate, dicyclopentanyl (meth) acrylate, isooctyl (meth)acrylate, lauryl (meth)acrylate, 2-hydroxy-3-phenoxy propyl (meth)acrylate, 1,4-cyclohexane dimethanol (meth)acrylate, 2-hydroxyethyl (meth) acrylate, 2-hydroxypropyl (meth)acrylate, 4-hydroxybutyl (meth)acrylate, acryloyl morpholine, N-vinyl caprolactam, N-vinylpyrrolidone, N-vinylformamide, and N-acryloyloxyethyl hexahydrophthalimide.

Examples of the polyfunctional monomer include dimethylol tricyclodecane di(meth)acrylate, (ethoxylated (or propoxylated)) bisphenol A di(meth)acrylate, cyclohexanedimethanol di(meth)acrylate, (poly)ethylene glycol di(meth)acrylate, (ethoxylated (or propoxylated)) 1,6-hexanediol di(meth)acrylate, 1,9-nonanediol di(meth)acrylate, 1,10-decanediol di(meth)acrylate, (ethoxylated (or propoxylated)) neopentylglycol di(meth)acrylate, hydroxy pivalic acid neopentyl glycol di(meth)acrylate, dipropylene glycol dimethacrylate, (neopentyl glycol-modified) trimethylolpropane di(meth)acrylate, tripropylene glycol di(meth) acrylate, dicyclopentanyl di(meth)acrylate, pentaerythritol tri(or tetra) (meth)acrylate, trimethylolpropane tri(or tetra) (meth)acrylate, tetramethylol methane tri(or tetra) (meth) acrylate, and dipentaerythritol hexa(meth)acrylate. Examples of the monomer having plural vinyl groups include butanediol divinylether, diethylene glycol divinylether, triethylene glycol divinylether, cyclohexane dimethanol divinylether, trimethylolpropane divinylether, pentaerythritol tri(or tetra) vinyl ether, trimethylolpropane diallyl ether, and pentaerythritol tri(or tetra) allyl ether.

These monomers may be used singly or in combination of two or more thereof as necessary.

The ink composition of the present invention preferably contains a monomer having at least one of an ethylene oxide (EO) main skeleton and a propylene oxide (PO) main skeleton, as the monomer other than 2-(2-vinyloxyethoxy) ethyl acrylate and dipropylene glycol diacrylate. These monomers have high affinity in between 2-(2-vinyloxyethoxy)ethyl acrylate and dipropylene glycol diacrylate. Therefore, since the distance between the monomers in the ink is short, these monomers have high reactivity, and thus allow the reduction of the residual monomer amount in the cured film. The content of the monomers containing 2-(2-vinyloxyethoxy)ethyl acrylate and dipropylene glycol diacrylate having at least one of an ethylene oxide (EO) and propylene oxide (PO) as a main skeleton is preferably 80% by weight or more, and more preferably 90% by weight or more in the total monomer amount in the ink.

Examples of the monomer having ethylene oxide (EO) or propylene oxide (PO) as the main skeleton include, in addition to 2-(2-vinyloxyethoxy)ethyl acrylate and dipropylene glycol diacrylate, phenoxy diethylene glycol (meth) acrylate, methoxy triethylene glycol (meth)acrylate, methoxy dipropylene glycol (meth)acrylate, dipropylene glycol (meth)acrylate, (poly) ethylene glycol di(meth)acrylate, dipropylene glycol dimethacrylate, and tripropylene glycol di(meth)acrylate.

The ink composition of the present invention must have a low viscosity from the viewpoint of ejection stability, and preferably contains a monomer having a molecular weight of 350 or less in the ratio of 90% by weight or more in the total monomer amount from the viewpoint of increasing flowability of the monomer in the cured film.

The ink composition may include, in addition to the above-described polymerizable monomer, an oligomer or a prepolymer. Specific examples include "Ebecryl 230, 244, 245, 270, 280/15IB, 284, 285, 4830, 4835, 4858, 4883, 8402, 8803, 8800, 254, 264, 265, 294/35HD, 1259, 1264, 4866, 9260, 8210, 1290.1290K, 5129, 2000, 2001, 2002, 2100, KRM7222, KRM7735, 4842, 210, 215, 4827, 4849, 6700, 6700-20T, 204, 205, 6602, 220, 4450, 770, IRR567, 81, 84, 83, 80, 657, 800, 805, 808, 810, 812, 1657, 1810, IRR302, 450, 670, 830, 835, 870, 1830, 1870, 2870, IRR267, 813, IRR483, 811, 436, 438, 446, 505, 524, 525, 554W, 584, 586, 745, 767, 1701, 1755, 740/40TP, 600, 601, 604, 605, 607, 608, 609, 600/25TO, 616, 645, 648, 860, 1606, 1608, 1629, 1940, 2958, 2959, 3200, 3201, 3404, 3411, 3412, 3415, 3500, 3502, 3600, 3603, 3604, 3605, 3608, 3700, 3700-20H, 3700-20T, 3700-25R, 3701, 3701-20T, 3703, 3702, RDX63182, 6040, IRR419 manufactured by Daicel-UCB Co. Ltd, CN104, CN120, CN124, CN136, CN151, CN2270, CN2271E, CN435, CN454, CN970, CN971, CN972, CN9782, CN981, CN9893, and CN991 manufactured by Sartomer Company, Inc., Laromer EA81, LR8713, LR8765, LR8986, PE56F, PE44F, LR8800, PE46T, LR8907, PO43F, PO77F, PE55F, LR8967, LR8981, LR8982, LR8992, LR9004, LR8956, LR8985, LR8987, UP35D, UA19T, LR9005, PO83F, PO33F, PO84F, PO94F, LR8863, LR8869, LR8889, LR8997, LR8996, LR9013, LR9019, PO9026V, and PE9027V manufactured by BASF, Photomer 3005, 3015, 3016, 3072, 3982, 3215, 5010, 5429, 5430, 5432, 5662, 5806, 5930, 6008, 6010, 6019, 6184, 6210, 6217, 6230, 6891, 6892, 6893-20R, 6363, 6572, and 3660 manufactured by Cognis Holding GmbH, Art Resin UN-9000HP, 9000PEP, 9200A, 7600, 5200, 1003, 1255, 3320HA, 3320HB, 3320HC, 3320HS, 901T, 1200TPK, 606OPTM, and 6060P manufactured by Negami Chemical Industrial Co., Ltd., Violet Light UV-6630B, 7000B, 7510B, 7461TE, 3000B, 3200B, 3210EA, 3310B, 3500BA, 3520TL, 3700B, 6100B, 6640B, 1400B, 1700B, 6300B, 7550B, 7605B, 7610B, 7620EA, 7630B, 7640B, 2000B, 2010B, 2250EA, and 2750B manufactured by Nippon Synthetic Chemical Industry Co., Ltd., KAYARAD R-280, R-146, R131, R-205, EX2320,R190, R130, R-300, C-0011, TCR-1234, ZFR-1122, UX-2201, UX-2301,UX3204, UX-3301, UX-4101,UX-6101, UX-7101, MAX-5101, MAX-5100, MAX-3510, and UX-4101 manufactured by Nippon Kayaku Co., Ltd.

(Pigment)

The pigment used in the inkjet ink composition of the present invention may be selected from common pigments used in ink compositions for printing and coating applications, according to the intended properties such as color development and light resistance. The pigment component may be selected from achromatic or chromatic organic pigments such as carbon black, titanium oxide, and calcium carbonate. Examples of the organic pigment include insoluble azo pigments such as toluidine red, toluidine maroon, Hansa yellow, benzidine yellow, and pyrazolone red, soluble azo pigments such as lithol red, Helio Bordeaux, pigment scarlet, and permanent red 2B, derivatives from vat dyes such as alizarin, indanthrone, and thioindigo maroon, phthalocyanine organic pigments such as phthalocyanine blue and phthalocyanine green, quinacridone organic pigments such as quinacridone red and quinacridone magenta, perylene organic pigments such as perylene red and perylene scarlet, isoindolinone organic pigments such as isoindolinone yellow and isoindolinone orange, pyranthrone organic pigments such as pyranthrone red and pyranthrone orange, thioindigo organic pigments, rhodaminelake organic pigments, condensed azo organic pigments, benzimidazolone organic pigments, quinophthalone organic pigments such as quinophthalone yellow, isoindoline organic pigments such as isoindoline yellow, naphthol organic pigments, and other pigments such as flavanthrone yellow, acyl amide yellow, nickel azo yellow, copper azo methine yellow, perinone orange, anthrone orange, dianthraquinonyl red, dioxazine violet, and lake pigments.

Examples of the color index (C.I.) number of the organic pigment include C.I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180, 185, and 213, C.I. Pigment Orange 16, 36, 43, 51, 55, 59, 61, 64, and 71, C.I. Pigment Red 9, 48, 49, 52, 53, 57, 81, 81:1, 81:2, 81:4, 81:5, 97, 122, 123, 146, 147, 149, 150, 168, 169, 177, 180, 184, 185, 192, 202, 206, 207, 208, 215, 216, 217, 220, 223, 224, 226, 227, 228, 238, 240, 245, and 269, C.I. Pigment Violet 1, 19, 23, 29, 30, 37, 40, and 50, C.I. Pigment Blue 15, 15:1, 15:3, 15:4, 15:6, 22, 60, and 64, C.I. Pigment Green 7 and 36, C.I. Pigment Brown 23, 25, and 26.

Among the above-described organic pigments, preferred examples include quinacridone organic pigments, phthalocyanine organic pigments, benzimidazolone organic pigments, isoindolinone organic pigments, condensed azo organic pigments, rhodaminelake organic pigments, quinophthalone organic pigments, and isoindoline organic pigments, because they have good balance between light resistance and color range, and thus are suitable for practical use.

Particularly preferred examples include C.I. Pigment Yellow 74, 120, 138, 139, 150, 151, 155, 180, 185, and 213 as yellow pigments, C.I. Pigment Red 122, 184, 185, 202, 206, 207, 208, and 245, C.I. Pigment Violet 19 as magenta pigments, C.I. Pigment Blue 15:3, 15:4, and 15:6 as cyan pigments, because they reproduce Japan Color 2007 and FOGRA39 in the desired amount. When a special color is used, C.I. Pigment Violet 23, C.I. Pigment Green 7, 36, and C.I. Pigment Orange 64, and 71 are preferred.

These pigments have very high coloring power, and exhibit good color reproducibility at a low pigment concentration. In addition, they show ideal spectroscopic reflection spectra, and exhibit high permeability in the ultraviolet ray region, in comparison with other pigments of the similar colors. Therefore, light energy is efficiently given to the initiator, and the initiator has higher reactivity even when the same amount of photoirradiation is carried out. Furthermore, these pigments show higher light resistance than dyes, so that are hard to cause color fading, and maintain good color reproducibility for a long term.

Specific examples of carbon black include "Special Black 350, 250, 100, 550, 5, 4, 4A, and 6", "Printex U, V, 140U, 140V, 95, 90, 85, 80, 75, 55, 45, 40, P, 60, L6, L, 300, 30, 3, 35, 25, A, and G", manufactured by Degussa, "REGAL 400R, 660R, 330R, and 250R", and "MOGUL E, L" manufactured by Cabot Corporation, "MA 7, 8, 11, 77, 100, 100R, 100S, 220, 230" "#2700, #2650, #2600, #200, #2350, #2300, #2200, #1000, #990, #980, #970, #960, #950, #900, #850, #750, #650, #52, #50, #47, #45, #45L, #44, #40, #33, #332, #30, #25, #20, #10, #5, CF9, #95, and #260" manufactured by Mitsubishi Chemical Corporation.

The pigment is preferably from 1% to c % by weight with reference to the ink total amount. The c herein is defined as follows:

c=the pigment concentration at which the average absorbance at 320 to 380 nm is 1.

The absorbance defined herein is the absorbance (Abs) of 2000-fold dilution of the ink with dipropylene glycol diacrylate, which is measured by using a spectrophotometer.

The content of the pigment is, preferably, 1 to 4% by weight for cyan ink, 1 to 10% by weight for magenta ink, 1 to 10% by weight for yellow ink, and 1 to 4% by weight for black ink. The content of the pigment is, more preferably, 1 to 2.9% by weight for cyan ink, 1 to 8.6% by weight for magenta ink, 1 to 7.5% by weight for yellow ink, and 1 to 2.7% by weight for black ink.

When the pigment is present in an ink in the amount of 1% by weight or more, sufficient color reproducibility will be achieved by single-pass. In addition, when the amount is c % by weight or less, a cured film having a low residual component will be obtained.

When the amount is within the above-described range, the proportion of absorption of active energy in the wavelength region of 320 to 380 nm, which most contributes to active energy ray curing, by the pigment is reduced, and sufficient active energy for generating active radicals in the inside of the ink film is given to the initiator.

(Dispersant)

In the present invention, inclusion of a dispersant is preferred, thereby improving dispersibility of the pigment and storage stability of the ink composition. Examples of the dispersant include hydroxylic carboxylate, high molecular weight unsaturated acid ester, polymer copolymer, modified polyurethane, modified polyacrylate, polyether ester anionic surfactants, polyoxyethylene alkyl phosphate, polyoxyethylene nonyl phenyl ether, and stearylamine acetate.

Specific examples of the dispersant include "Disperbyk-101 (polyaminoamide phosphate and acid ester), 107 (hydroxylic carboxylate), 110, 111 (copolymers containing acid group), 130 (polyamide), 161, 162, 163, 164, 165, 166, 167, 168, 170 (polymeric copolymer)", "400", "Bykumen" (high molecular weight unsaturated acid ester), "BYK-P104, P105 (high molecular weight unsaturated acid polycarboxylic acid)", "P104S, 240S (high molecular weight unsaturated acid polycarboxylic acid and silicone)", "LACTIMON (long-chain amine and unsaturated polycarboxylic acid and silicone)" manufactured by BYK Chemie.

Other examples include "EFKA 44, 46, 47, 48, 49, 54, 63, 64, 65, 66, 71, 701, 764, 766", "EFKA POLYMER 100 (modified polyacrylate), 150 (aliphatic modified polymer), 400, 401, 402, 403, 450, 451, 452, 453 (modified polyacrylate), 745 (copper phthalocyanine)" manufactured by Efka CHEMICALS, "FLOWLEN TG-710 (urethane oligomer), "FLOWNON SH-290, SP-1000", "POLYFLOW No. 50E, No. 300 (acrylic copolymer)" manufactured by Kyoeisha Chemical Co., Ltd., "DISPARLON KS-860, 873SN, 874 (polymeric dispersant), #2150 (aliphatic polycarboxylic acid), and #7004 (polyether ester)" manufactured by Kusumoto Chemicals, Ltd.

Yet other examples include "HOMOGENOL L-18 (polycarboxylic acid polymer), "EMULGEN 920, 930, 931, 935, 950, 985 (polyoxyethylene nonyl phenyl ether), "ACETAMIN 24 (coconut amine acetate), 86 (stearylamine acetate)" manufactured by Kao Corporation, "SOLSPERSE 5000 (phthalocyanine ammonium salt), 13940 (polyester amine), 17000 (fatty acid amine), 24000GR, 32000, 33000, 39000, 41000, 53000, 76400, 76500, J100, and J180 (polyethyleneimine)" manufactured by The Lubrizol Corporation, "NIKKOL T106 (polyoxyethylene sorbitan monooleate), MYS-IEX (polyoxyethylene monostearate), Hexagline 4-0 (hexagryceryl tetraoleate)" manufactured by Nikko Chemicals Co., Ltd., "AJISPAR PB821, 822, 824, 827, 711" manufactured by Ajinomoto Fine-Techno Co., Inc., and "TEGO Disper685" manufactured by Tego Chemie GmbH.

Among them, basic resin pigment dispersants having a block structure or comb structure are preferred from the viewpoint of dispersion stability and inkjet ejection stability of the pigment.

Specific examples of the commercial product include SOLSPERSE 24000, 32000, 76400, 76500, J100, J180, and Disperbyk-161, 162, 163, 164, 165, 166, 167, and 168 manufactured by The Lubrizol Corporation.

The blending quantity of the dispersant is freely selected according to the intended stability. When the amount of the dispersant is 10 to 150% by weight with reference to the pigment, the ink has excellent flow characteristics. This range is preferred, because the ink has good dispersion stability and maintains initial quality even after the lapse of a long time. The amount of the dispersant is more preferably 20 to 80% by weight with reference to the pigment thereby achieving high precision and high productivity, because dispersion is very stable, and stable ejection properties are exhibited even in the high frequency region at 20 kHz or higher.

The dispersion may contain an organic pigment derivative, thereby further improving dispersibility of the pigment and storage stability of the ink composition.

The organic pigment derivative (may be referred to as a pigment derivative) is a compound or a metal salt compound composed of an organic pigment as the main skeleton, and a substituent such as sulfonic acid, a sulfonamide group, an amino methyl group, or a phthalimide methyl group as the side chain.

Among them, when a pigment derivative containing a triazine ring in the skeleton, or a pigment derivative containing aluminum sulfonate salt is used, very stable dispersion of the pigment is achieved. As a result of this, stable ejection properties are exhibited even after continuous ejection for a long time, and stable ejection properties are exhibited even in the high frequency region at 20 kHz or higher, so that high precision and high productivity are achieved.

The blending quantity of the pigment derivative is freely selected according to the intended stability. From the viewpoint of the flow characteristics of the ink, the active ingredient (or the solid content (nonvolatile component) of the pigment derivative) is preferably 3 to 12% by weight, and more preferably 5 to 10% by weight with reference to 100% by weight of the pigment. Within this range, the ink has good dispersion stability and maintains initial quality even after the lapse of a long time.

(Solvent)

The ink composition may contain an organic solvent, thereby decreasing the viscosity and improving ejection stability. Examples of the organic solvent include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethyl diglycol, diethylene glycol dialkyl ether, tetraethylene glycol dialkyl ether, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butylate, ethylene glycol monoethyl ether butylate, ethylene glycol monobutyl ether butylate, diethylene glycol monomethyl ether butylate, diethylene glycol monoethyl ether butylate, diethylene glycol monobutyl ether butylate, propylene glycol monomethyl ether butylate, dipropylene glycol monomethyl ether butylate; glycol diacetates such as ethylene glycol diacetate, diethylene glycol diacetate, propylene glycol diacetate, dipropylene glycol diacetate, ethylene glycol acetate propionate, ethylene glycol acetate butylate, ethylene glycol propionate butylate, ethylene glycol dipropionate, ethylene glycol acetate dibutylate, diethylene glycol acetate propionate, diethylene glycol acetate butylate, diethylene glycol propionate butylate, diethylene glycol dipropionate, diethylene glycol acetate dibutylate, propylene glycol acetate propionate, propylene glycol acetate butylate, propylene glycol propionate butylate, propylene glycol dipropionate, propylene glycol acetate dibutylate, dipropylene glycol acetate propionate, dipropylene glycol acetate butylate, dipropylene glycol propionate butylate, dipropylene glycol dipropionate, dipropylene glycol acetate dibutylate; glycols such as ethylene glycol, diethylene glycol, triethylene glycol, propylene glycol, and dipropylene glycol; glycol ethers such as ethylene glycol monobutyl ether, propylene glycol monomethyl ether, propylene glycol monobutyl ether, diethylene glycol monoethyl ether, diethylene glycol diethyl ether, diethylene glycol monobutyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, and tripropylene glycol monomethyl ether; and lactates such as methyl lactate, ethyl lactate, propyl lactate, and butyl lactate. Among them, ethylene glycol monobutyl ether acetate and diethylene glycol diethyl ether are preferred, because they improve ejection stability through the reduction of viscosity, and improvement of solubility of the dispersant and initiator.

The blending quantity of the organic solvent is preferably 5% by weight or less with reference to the ink composition, from the viewpoint of curability and residual properties. The blending quantity is more preferably 1% by weight or less, and particularly preferably 0.5% by weight or less.

The moisture amount in the ink composition is preferably 2% by weight or less. When the moisture amount is 2% by weight or less, the ink has good storage stability and good ejection stability, and causes no deterioration in color reproduction. The moisture amount is more preferably 1% by weight or less, and particularly preferably 0.5% by weight or less. When the moisture amount is 0.5% by weight or less, the residual amount is decreased without inhibiting curing reaction by the active energy rays.

(Single Pass Printing)

The inkjet printing method of "single-pass printing" in the present description is the printing method of accomplishing printing in one time on the printing medium, and is suitable for business printing requiring printing speed. In recent years, productivity is a very important factor in inkjet printing as an alternative to prior art offset printing, and single-pass curable inkjet printing is highly expected. Furthermore, in the single-pass curable inkjet printing, if high-speed printing at 25 m/M (meter/minute), further 50 m/M is achieved, it will be more widely used as an alternative to offset or gravure printing.

(Active Energy Rays)

Active energy rays refer to energy rays such as electron rays, ultraviolet rays, and infrared rays which influence the electron orbits of the object to be irradiated, and can trigger polymerization reaction of radicals, cations, and anions. The active energy rays are not limited to these examples, as long as they induce polymerization reaction.

When ultraviolet rays are applied as the light source of active energy rays, for example, a high pressure mercury lamp, a metal halide lamp, a low-pressure mercury lamp, an ultrahigh pressure mercury lamp, an ultraviolet ray laser, an LED, and sunlight may be used. An ultraviolet irradiator is often used as the light source of active energy rays mounted on a printing machine, from the viewpoints of convenience and price.

The light source (lamp) of the active energy rays used in the present invention preferably has an emission peak wavelength of 320 to 380 nm. In the wavelength region of 320 to 380 nm, energy attenuation by the absorption of a pigment or the like is small, and a sufficient energy is given for the reaction of the initiator. Specifically, a metal halide lamp, a low-pressure mercury lamp, an ultrahigh pressure mercury lamp, and a LED are preferred.

(Initiator)

In curing of the ink with active energy rays, a photoradical polymerization initiator and a sensitizer may be used. The photoradical polymerization initiator and sensitizer may be freely selected in consideration of the curing rate, physical properties of the cured coating film, and coloring material.

The initiator contained in the ink composition of the present invention may be freely selected, as long as the high-speed curability and low residual rate are satisfied. In particular, those of molecule cleavage type or hydrogen abstraction type are suitable for the present invention. Specific examples include 2,4,6-trimethylbenzoyl-diphenylphosphine oxide, 2,4,6-triethylbenzoyl-diphenylphosphine oxide, 2,4,6-triphenylbenzoyl-diphenylphosphine oxide, bis(2,4,6-trimethylbenzoyl)-phenylphosphine oxide, and bis(2,6-dimethoxybenzoyl)-2,4,4-trimethylpentylphosphine oxide, benzoin isobutyl ether, 2,4-diethylthioxanthone, 2-isopropylthioxanthone, 2-benzyl-2-dimethylamino-1-(4-morpholinophenyl)-butane-1-one, 2-methyl-1-(4-methylthiophenyl)-2-morpholinopropane-1-one, 2-(dimethylamino)-2-[(4-methylphenyl)methyl]-1-[4-(4-morpholinyl)phenyl]-1-butanone, oligo(2-hydroxy-2-methyl-1-(4-(1-methylvinyl)phenyl)propanone), 4-benzoyl-4'-methyl-diphenyl sulfide, 1,2-octanedione, 1-(4-(phenylthio)-2,2-(O-benzoyloxime)), 1-hydroxycyclohexylphenyl ketone, benzoin ethyl ether, benzyl dimethylketal, 2-hydroxy-2-methyl-1-phenylpropane-1-one, 1-(4-isopropylphenyl)-2-hydroxy-2-methylpropane-1-one, benzophenone, 4-phenylbenzophenone, and isophthalphenone.

The initiator may be combined with an amine as the sensitizer, such as trimethylamine, methyldimethanolamine, triethanolamine, p-diethylaminoacetophenone, p-ethyl dimethylaminobenzoate, p-isoamyl dimethylaminobenzoate, N,N-dimethylbenzylamine, and 4,4'-bis(diethylamino)benzophenone. The initiator and sensitizer are preferably selected from those having high solubility to the ink composition, and will not inhibit permeation of active energy rays.

Among them, the initiators having an absorption at 320 to 380 nm, which is the emission wavelength of an ultraviolet irradiation lamp, are preferred. Specific preferred examples include 4,4'-bis-(dimethylamino)benzophenone, 2-benzyl-2-dimethylamino-1-(4-morpholinophenyl)-butane-1-one, 2-(dimethylamino)-2-[(4-methylphenyl)methyl]-1-[4-(4-morpholinyl) phenyl]-1-butanone, 2,4,6-trimethylbenzoyl-diphenylphosphine oxide, and bis(2,4,6-trimethylbenzoyl)-phenylphosphine oxide. Through the use of them, the initiator sufficiently absorbs active energy, efficiently generates active radicals, and progresses subsequent monomer curing, whereby the initiator in the cured film, and the residual amount of the monomer are reduced.

The initiator and sensitizer may be one or more compounds in consideration of the wavelength spectrum of active energy rays, and the light absorption spectrum of the initiator, and the combination of two or more compounds is more preferred. The combination of two or more compounds allows more efficient absorption of active energy rays, and smooth progress to the curing reaction.

The content of the initiator in the ink composition is preferably from 2 to 20% by weight, more preferably from 3 to 15% by weight, and even more preferably from 5 to 10% by weight. When the content is from 5 to 10% by weight, high-speed curability is achieved, and the residual amount of the monomer and initiator in the cured film are reduced.

The ink composition may contain prior art additives such as a leveling agent, an anti-foaming agent, a flowability modifier, a fluorescent brightening agent, a polymerization inhibitor, and an antioxidant, as long as the intended quality is satisfied.

(Leveling Agent)

In the present invention, a leveling agent may be added, thereby improving spreadability on the base material.

The leveling agent is preferably silicone-based, from the viewpoint of prevention of repellence due to compatibility. Examples of the silicone leveling agent include silicone modified acrylates, organic modified polysiloxanes, and polyether modified polysiloxane copolymers.

Among them, the use of a silicone modified acrylate having a reactive group such as an acryloyl group reduces the residual rate in the cured film.

The blending quantity of the leveling agent in the ink is preferably from 0.01 to 5% by weight, more preferably from 0.01 to 3% by weight, and particularly preferably from 0.1 to 2% by weight. When the blending quantity is 0.01% by weight or more, good spreadability is achieved, and when 5% by weight or less, the leveling agent is sufficiently oriented at the ink interface, and achieves sufficient effect. The leveling agent may be used singly or in combination of two or more thereof as necessary.

The ink composition preferably has a viscosity of 5 to 17 mPa·s at 25° C. When the viscosity is 5 mPa·s or more, good ejection is achieved. When the viscosity is 17 mPa·s or less, ejection accuracy will not decrease, and deterioration of the image quality is small. The viscosity is more preferably from 8 to 14 mPa·s, thereby giving high frequency suitability for supporting high-speed printing.

(Residual Amount in Cured Film)

In the present invention, the residual component in the cured film means the component extracted from the cured film which is analyzed to be identical to the component contained in the ink components.

For example, GCMS (gas chromatography mass spectrometry, LCMS (liquid chromatography mass spectrometry), HPLC (high effectiveness liquid chromatography) are preferred for the identification and determination of the monomer, initiator, and additives, and these analysis means may be freely selected according to the easiness of quantification.

The specific method for measuring the residual amount is as described in Examples. For example, the cured film is cut into a 10-cm square together with the base material, immersed in 1000 mL of methyl ethyl ketone contained in a sealed container for 3 days at 60° C., and the residual components are extracted from the cured film. After a lapse of 2 days, methyl ethyl ketone is stirred for homogenization, and taken out from the container. The extracted components are identified by GCMS (GCMS-QP2010 Plus manufactured by Shimadzu Co., Ltd.) and HPLC (manufactured by Shimadzu Co., Ltd.), and the calibration curves of the detected compounds are drawn for determining the compounds, thereby calculating the amounts of the monomer, initiator, and other components remaining in the cured film.

(Residual Rate)

The residual rate of the monomer or initiator is analyzed using the means as described in Examples. The residual rate shows the proportions of the raw materials such as the monomer and initiator remaining in the cured film with reference to the cured film weight (g). The residual rate is markedly correlated with the migration value defined by EU in the migration test for food packaging use, and the reduction of the residual rate is compulsory for supporting food packaging. In addition, the ink of the present invention is designed to have a low viscosity, and thus contains a large amount of monomer having a relatively low molecular weight.

Monomers having a relatively low molecular weight generally have an odor, so that the odor is emitted from the cured film when the residual rate is high, and can be claimed by consumers. In particular, the reduction of the residual rate is compulsory in the markets where quality standard is strict, such as Japanese and European markets. In other words, the provision of a cured film containing as low residual low molecular components (unreacted components) as possible is the response to the demand in the food, cosmetic, and pharmaceutical packaging markets, and the key to the replacement of the existing market.

(Ink Set)

The ink set of the present invention is composed of two or more color inks selected from cyan, magenta, yellow, black, and white inks, which are stored separately.

In particular, black readily absorbs the energy of active energy rays, and hinders the delivery of the energy to the inside of the cured film. As a result of this, when two or more colors are printed in layers, curing of the inside of the cured film is difficult. In addition, white is generally used for 100% solid printing, so that curing of the inside of the cured film is difficult when two or more colors are printed in layers. Therefore, black or white is preferably combined with one or more colors in the ink set, thereby achieving marked effect of the present invention.

The ink set preferably contains at least one of ink compositions of cyan, magenta, yellow, and black. In the ink set, the cyan ink composition contains at least one pigment selected from C.I. Pigment Blue 15:3, C.I. Pigment Blue 15:4, and C.I. Pigment Blue 15:6, the magenta ink composition contains at least one of pigment selected from C.I. Pigment Red 122, C.I. Pigment Red 184, C.I. Pigment Red 185, C.I. Pigment Red 202, C.I. Pigment Red 208, C.I. Pigment Red 245, and C.I. Pigment violet 19, the yellow ink composition contains at least one of pigment selected from C.I. Pigment Yellow 74, C.I. Pigment Yellow 120, C.I. Pigment Yellow 138, C.I. Pigment Yellow 139, C.I. Pigment Yellow 150, C.I. Pigment Yellow 151, C.I. Pigment Yellow 155, C.I. Pigment Yellow 180, C.I. Pigment Yellow 185, and C.I. Pigment Yellow 213, and the black ink composition contains C.I. Pigment Black 7.

EXAMPLES

The present invention is more specifically described below based on examples, but the following examples will not limit the scope of the claims of the present invention. In the examples, "part" means "part by weight".

(Preparation of Pigment Dispersion)

According to the ingredient and blending quantity (parts by weight) of the raw materials listed in Table 1, the pigment, dispersant, and monomer were mixed, and then dispersed using a microbead disperser (DCP mill) for 1 hour, and thus pigment dispersions 1 to 9 were obtained. The dispersion was performed by using Zr beads having a diameter of 0.3 mm, and the volume filling rate was 75%.

The raw materials of the dispersion are as listed below.

(Pigment)

Pigment Blue 15:3: "Lionol Blue 7351" manufactured by Toyocolor Co., Ltd.

Pigment Blue 15:4: "Lionol Blue 7400G" manufactured by Toyocolor Co., Ltd.

Pigment Red 122: "Hostaperm Pink E" manufactured by Clariant International Ltd.

Pigment Violet 19: "Hostaperm Red E5B 02" manufactured by Clariant International Ltd.

Pigment Red 202: "Cinquasia Magenta RT-235D" manufactured by BASF

Pigment Yellow 150: "Yellow Pigment E4GN" manufactured by LANXESS

Pigment Yellow 180: "Novoperm Yellow P-HG" manufactured by Clariant International Ltd.

Pigment Yellow 185: "Paliotol Yellow D 1155" manufactured by BASF

Pigment Black 7: "Special Black 350" manufactured by Evonik Degussa (Pigment Dispersant)

Solsperse 24000: polyethyleneimine pigment dispersant, "Solsperse 24000" manufactured by The Lubrizol Corporation)

Solsperse J180: polyethyleneimine pigment dispersant, "Solsperse J180" manufactured by The Lubrizol Corporation)

(Monomer)

DPGDA: dipropylene glycol diacrylate, "Laromer DPGDA" manufactured by BASF)

TABLE 1

| | | Dispersion | | | | | | | | |
|---|---|---|---|---|---|---|---|---|---|---|
| | Raw material | 1 | 2 | 3 | 4 | 5 | 6 | 7 | 8 | 9 |
| Pigment | Pigment Blue 15:3 | 20 | | | | | | | | |
| | Pigment Blue 15:4 | | 20 | | | | | | | |
| | Pigment Red 122 | | | 20 | | | | | | |
| | Pigment Violet 19 | | | | 20 | | | | | |
| | Pigment Red 202 | | | | | 20 | | | | |
| | Pigment Yellow 150 | | | | | | 20 | | | |
| | Pigment Yellow 180 | | | | | | | 20 | | |
| | Pigment Yellow 185 | | | | | | | | 20 | |
| | Pigment Black 7 | | | | | | | | | 20 |

TABLE 1-continued

|  | | Dispersion | | | | | | | | |
|---|---|---|---|---|---|---|---|---|---|---|
| Raw material | | 1 | 2 | 3 | 4 | 5 | 6 | 7 | 8 | 9 |
| Dispersant | Solsperse 24000 | 4 | 8 | | | | | 4 | 8 | |
| | Solsperse J180 | | | 4 | 8 | 16 | | | | |
| Monomer | DPGDA | 76 | 72 | 76 | 72 | 64 | 76 | 72 | 64 | 72 |

(Preparation of Ink Composition)

According to the ingredient and blending quantity listed in Tables 2 to 5, into the obtained pigment dispersions, the monomer, initiator, solvent, inhibitor, and additive were added in this order, under slow stirring. Thereafter, the mixture was gently stirred until the initiator was completely dissolved. The resulting liquid was filtered through PTFE filter having a pore diameter of 0.5 micron, the coarse particles were removed, and thus an inkjet ink composition was obtained.

Tables 2 to 5 list the proportions of the pigment, 2-(2-vinyloxyethoxy)ethyl acrylate (VEEA), and dipropylene glycol diacrylate (DPGDA) with reference to the total amount of each of the ink composition, and the average absorbance of each of the ink composition at 320 to 380 nm. The absorbance is the value obtained by: performing spectrum measurement of 2000-fold dilution of the ink with dipropylene glycol diacrylate, using a spectrophotometer (U-3300 spectrophotometer, manufactured by Hitachi High-Technologies Corporation.); and then averaging the obtained absorbance at 320 to 380 nm in the spectrum.

(Monomer)

DPGDA: dipropylene glycol diacrylate, "Laromer DPGDA" manufactured by BASF)

VEEA: 2-(2-vinyloxyethoxy)ethyl acrylate ("VEEA" manufactured by Nippon Shokubai Co., Ltd.)

TPGDA: tripropylene glycol diacrylate ("Miramer M220" manufactured by Miwon Specialty Chemical Co., Ltd.)

TPGDA: phenoxyethyl acrylate ("Biscoat 192" manufactured by Osaka Organic Chemical Industry Ltd.)

DDDA: 1,10-decanediol diacrylate ("SR595" manufactured by Sartomer)

(Initiator)

EAB-SS: 4,4'-bis-(dimethylamino)benzophenone (manufactured by Daido Chemical Corporation)

Irgacure 369: 2-benzyl-2-dimethylamino-1-(4-morpholinophenyl)-butanone-1 (manufactured by BASF)

Irgacure 379: 2-(dimethylamino)-2-[(4-methylphenyl)methyl]-1-[4-(4-morpholinyl)phenyl]-1-butanone (manufactured by BASF)

TPO: 2,4,6-trimethylbenzoyl-diphenylphosphine oxide ("Darocur TPO" manufactured by BASF)

Irgacure 819: bis(2,4,6-trimethylbenzoyl)-phenylphosphine oxide (manufactured by BASF)

DETX: 2,4-diethylthioxanthone ("KAYACURE DETX-S" manufactured by Nippon Kayaku Co., Ltd.)

Esacure 1001M: 1-[4-(4-benzoylphenylsulfanyl)phenyl]-2-methyl-2-(4-methylphenylsulfonyl)propane-1-one ("ESACURE 1001M" manufactured by Lamberti)

(Solvent)

DEDG: diethylene glycol diethyl ether (manufactured by Nippon Nyukazai Co., Ltd.)

BDGAC: diethylene glycol monobutyl ether acetate (manufactured by Daicel Corporation)

(Inhibitor)

Phenothiazine: phenothiazine (manufactured by Seiko Chemical Co., Ltd.)

(Additive)

TegoGlide 450: polyether modified polysiloxane copolymer (manufactured by Degussa)

TABLE 2

| | | Ink | | | | | | | |
|---|---|---|---|---|---|---|---|---|---|
| Raw material | | C1 | M1 | Y1 | K1 | C2 | M2 | Y2 | K2 |
| Dispersion | 1 | 10 | | | | 13 | | | |
| | 2 | | | | | | | | |
| | 3 | | 10 | | | | 20 | | |
| | 4 | | | | | | | | |
| | 5 | | | | | | | | |
| | 6 | | | 20 | | | | | |
| | 7 | | | | | | | 10 | |
| | 8 | | | | | | | | |
| | 9 | | | | 10 | | | | 10 |
| Monomer | VEEA | 40 | 40 | 38 | 40 | 37.3 | 40 | 38 | 40 |
| | DPGDA | 30 | 30 | 20 | 25.4 | 40 | 31.3 | 41.9 | 40.3 |
| | TPGDA | | | | | | | | |
| | PEA | | | | | | | | |
| | DDDA | 10.4 | 11.4 | 12 | 15 | | | | |
| Initiator | EAB-SS | 3 | 2 | 2 | | 3 | 2 | 2 | |
| | Irgacure369 | 3 | | | 3 | 3 | | | 3 |
| | Irgacure379 | | 3 | 3 | | | 3 | 3 | |
| | TPO | 3 | | 4.4 | 3 | 3 | | 4.4 | 3 |
| | Irgacure819 | | 3 | | 3 | | 3 | | 3 |
| | DETX | | | | | | | | |
| | Esacure1001M | | | | | | | | |
| Solvent | DEDG | | | | | 0.1 | 0.1 | | |
| | BDGAC | | | | | | | 0.1 | 0.1 |
| Inhibitor | Phenothiazine | 0.1 | 0.1 | 0.1 | 0.1 | 0.1 | 0.1 | 0.1 | 0.1 |
| Additive | TegoGlide450 | 0.5 | 0.5 | 0.5 | 0.5 | 0.5 | 0.5 | 0.5 | 0.5 |
| Total | | 100 | 100 | 100 | 100 | 100 | 100 | 100 | 100 |

TABLE 2-continued

| | | Ink | | | | | | | |
|---|---|---|---|---|---|---|---|---|---|
| Average absorbance at 320-380 nm | | 0.68 | 0.23 | 0.56 | 0.73 | 0.88 | 0.46 | 0.25 | 0.73 |
| Proportion | Pigment | 2.0% | 2.0% | 4.0% | 2.0% | 2.6% | 4.0% | 2.0% | 2.0% |
| | VEEA | 40.0% | 40.0% | 38.0% | 40.0% | 37.3% | 40.0% | 38.0% | 40.0% |
| | DPGDA | 37.6% | 37.6% | 35.2% | 32.6% | 49.9% | 46.5% | 49.1% | 47.5% |

| Raw material | | C3 | M3 | Y3 | K3 | C4 | M4 | Y4 | K4 |
|---|---|---|---|---|---|---|---|---|---|
| Dispersion | 1 | 13 | | | | 13 | | | |
| | 2 | | | | | | | | |
| | 3 | | 30 | | | | | | |
| | 4 | | | | | | 10 | | |
| | 5 | | | | | | | | |
| | 6 | | | | | | | | |
| | 7 | | | 20 | | | | 30 | |
| | 8 | | | | | | | | |
| | 9 | | | | 10 | | | | 10 |
| Monomer | VEEA | 55 | 50 | 50 | 50 | 38 | 38 | 38 | 38 |
| | DPGDA | 23 | 11.4 | 20 | 30.4 | 32.9 | 38.9 | 18.9 | 38.9 |
| | TPGDA | | | | | | | | |
| | PEA | | | | | | | | |
| | DDDA | | | | | | | | |
| Initiator | EAB-SS | | | | | 3 | 2 | 2 | |
| | Irgacure369 | 2 | 2 | 2 | | 3 | | | |
| | Irgacure379 | | | | 3 | | 3 | 3 | |
| | TPO | 3.4 | 3 | 3 | 3 | 3 | | | 3 |
| | Irgacure819 | 3 | 3 | 4.4 | 3 | | | | 3 |
| | DETX | | | | | | | | 6 |
| | Esacure1001M | | | | | 6 | 7 | 7 | |
| Solvent | DEDG | | | | | 0.5 | 0.5 | | |
| | BDGAC | | | | | | | 0.5 | 0.5 |
| Inhibitor | Phenothiazine | 0.1 | 0.1 | 0.1 | 0.1 | 0.1 | 0.1 | 0.1 | 0.1 |
| Additive | TegoGlide450 | 0.5 | 0.5 | 0.5 | 0.5 | 0.5 | 0.5 | 0.5 | 0.5 |
| Total | | 100 | 100 | 100 | 100 | 100 | 100 | 100 | 100 |
| Average absorbance at 320-380 nm | | 0.88 | 0.69 | 0.51 | 0.73 | 0.88 | 0.23 | 0.76 | 0.73 |
| Proportion | Pigment | 2.6% | 6.0% | 4.0% | 2.0% | 2.6% | 2.0% | 6.0% | 2.0% |
| | VEEA | 55.0% | 50.0% | 50.0% | 50.0% | 38.0% | 38.0% | 38.0% | 38.0% |
| | DPGDA | 32.9% | 34.2% | 34.4% | 37.6% | 42.8% | 46.1% | 40.5% | 46.1% |

TABLE 3

| Raw material | | Ink | | | | | | | | | | | |
|---|---|---|---|---|---|---|---|---|---|---|---|---|---|
| | | C5 | M5 | Y5 | K5 | C6 | M6 | Y6 | K6 | C7 | M7 | Y7 | K7 |
| Dispersion | 1 | | | | | | | | | | | | |
| | 2 | 10 | | | | 10 | | | | 10 | | | |
| | 3 | | | | | | | | | | | | |
| | 4 | | 20 | | | | 30 | | | | | | |
| | 5 | | | | | | | | | | | 20 | |
| | 6 | | | | | | | | | | | | |
| | 7 | | | | | | | | | | | | |
| | 8 | | | 10 | | | | 20 | | | | 30 | |
| | 9 | | | | 12 | | | | 12 | | | | 12 |
| Monomer | VEEA | 40 | 40 | 40 | 40 | 40 | 40 | 40 | 40 | 40 | 40 | 38 | 40 |
| | DPGDA | 37.4 | 29.4 | 38.4 | 36.4 | 30 | 11.4 | 22 | 23.4 | 30 | 21.4 | 14 | 23.4 |
| | TPGDA | | | | | 10.4 | 10 | 8 | 15 | | | | |
| | PEA | | | | | | | | | 10.4 | 10 | 8 | 15 |
| | DDDA | | | | | | | | | | | | |
| Initiator | EAB-SS | 3 | | | | 3 | 2 | 2 | | 3 | 2 | 2 | |
| | Irgacure369 | 3 | | | | 3 | | | 3 | 3 | | | 3 |
| | Irgacure379 | | | | | | 3 | 3 | | | 3 | 3 | |
| | TPO | | | | | 3 | | 4.4 | 3 | 3 | | 4.4 | 3 |
| | Irgacure819 | | | | | | 3 | | 3 | | 3 | | 3 |
| | DETX | 3 | 5 | 6 | 6 | | | | | | | | |
| | Esacure1001M | 3 | 5 | 5 | 5 | | | | | | | | |

TABLE 3-continued

| | | Ink | | | | | | | | | | | |
|---|---|---|---|---|---|---|---|---|---|---|---|---|
| Raw material | | C5 | M5 | Y5 | K5 | C6 | M6 | Y6 | K6 | C7 | M7 | Y7 | K7 |
| Solvent | DEDG | | | | | | | | | | | | |
| | BuCBAc | | | | | | | | | | | | |
| Inhibitor | Phenothiazine | 0.1 | 0.1 | 0.1 | 0.1 | 0.1 | 0.1 | 0.1 | 0.1 | 0.1 | 0.1 | 0.1 | 0.1 |
| Additive | TegoGlide450 | 0.5 | 0.5 | 0.5 | 0.5 | 0.5 | 0.5 | 0.5 | 0.5 | 0.5 | 0.5 | 0.5 | 0.5 |
| | Total | 100 | 100 | 100 | 100 | 100 | 100 | 100 | 100 | 100 | 100 | 100 | 100 |
| Average absorbance at 320-380 nm | | 0.68 | 0.46 | 0.27 | 0.88 | 0.68 | 0.69 | 0.54 | 0.88 | 0.68 | 0.46 | 0.81 | 0.88 |
| Proportion | Pigment | 2.0% | 4.0% | 2.0% | 2.4% | 2.0% | 6.0% | 4.0% | 2.4% | 2.0% | 4.0% | 6.0% | 2.4% |
| | VEEA | 40.0% | 40.0% | 40.0% | 40.0% | 40.0% | 40.0% | 40.0% | 40.0% | 40.0% | 40.0% | 38.0% | 40.0% |
| | DPGDA | 44.6% | 43.8% | 44.8% | 45.0% | 37.2% | 33.0% | 34.8% | 32.0% | 37.2% | 34.2% | 33.2% | 32.0% |

TABLE 4

| | | Ink | | | | | | | |
|---|---|---|---|---|---|---|---|---|---|
| Raw material | | C8 | M8 | Y8 | K8 | C9 | M9 | Y9 | K9 |
| Dispersion | 1 | | | | | | | | |
| | 2 | 15 | | | | 2 | | | |
| | 3 | | 45 | | | | 3 | | |
| | 4 | | | | | | | | |
| | 5 | | | | | | | | |
| | 6 | | | | | | | | |
| | 7 | | | | | | | | |
| | 8 | | | 40 | | | | 2 | |
| | 9 | | | | 15 | | | | 2 |
| Monomer | VEEA | 40 | 38 | 40 | 40 | 40 | 38 | 40 | 40 |
| | DPGDA | 35.4 | 8.4 | 10 | 35.4 | 48.4 | 50.4 | 48 | 48.4 |
| | TPGDA | | | | | | | | |
| | PEA | | | | | | | | |
| | DDDA | | | | | | | | |
| Initiator | EAB-SS | 3 | 2 | 2 | | 3 | 2 | 2 | |
| | Irgacure369 | 3 | | | 3 | 3 | | | 3 |
| | Irgacure379 | | 3 | 3 | | | 3 | 3 | |
| | TPO | 3 | | 4.4 | 3 | 3 | | 4.4 | 3 |
| | Irgacure819 | | 3 | | 3 | | 3 | | 3 |
| | DETX | | | | | | | | |
| | Esacure1001M | | | | | | | | |
| Solvent | DEDG | | | | | | | | |
| | BDGAC | | | | | | | | |
| Inhibitor | Phenothiazine | 0.1 | 0.1 | 0.1 | 0.1 | 0.1 | 0.1 | 0.1 | 0.1 |
| Additive | TegoGlide450 | 0.5 | 0.5 | 0.5 | 0.5 | 0.5 | 0.5 | 0.5 | 0.5 |
| | Total | 100 | 100 | 100 | 100 | 100 | 100 | 100 | 100 |
| Average absorbance at 320-380 nm | | 1.01 | 1.04 | 1.08 | 1.09 | 0.14 | 0.07 | 0.05 | 0.15 |
| Proportion | Pigment | 3.0% | 9.0% | 8.0% | 3.0% | 0.4% | 0.6% | 0.4% | 0.4% |
| | VEEA | 40.0% | 38.0% | 40.0% | 40.0% | 40.0% | 38.0% | 40.0% | 40.0% |
| | DPGDA | 46.2% | 42.6% | 35.6% | 46.2% | 49.8% | 52.7% | 49.3% | 49.8% |
| | | C10 | M10 | Y10 | K10 | C11 | M11 | Y11 | K11 |
| Dispersion | 1 | 13 | | | | 13 | | | |
| | 2 | | | | | | | | |
| | 3 | | 20 | | | | 20 | | |
| | 4 | | | | | | | | |
| | 5 | | | | | | | | |
| | 6 | | | | | | | | |
| | 7 | | | 20 | | | | 20 | |
| | 8 | | | | | | | | |
| | 9 | | | | 10 | | | | 10 |
| Monomer | VEEA | 35 | 35 | 35 | 35 | 64 | 64 | 64 | 64 |
| | DPGDA | 42.4 | 36.4 | 35 | 45.4 | 13.4 | 7.4 | 6 | 16.4 |
| | TPGDA | | | | | | | | |
| | PEA | | | | | | | | |
| | DDDA | | | | | | | | |
| Initiator | EAB-SS | 3 | 2 | 2 | | 3 | 2 | 2 | |
| | Irgacure369 | 3 | | | 3 | 3 | | | 3 |

TABLE 4-continued

| | | \multicolumn{8}{c}{Ink} | | | | | | | |
|---|---|---|---|---|---|---|---|---|
| | Irgacure379 | | 3 | 3 | | | 3 | 3 | |
| | TPO | 3 | | 4.4 | 3 | 3 | | 4.4 | 3 |
| | Irgacure819 | | 3 | | 3 | | 3 | | 3 |
| | DETX | | | | | | | | |
| | Esacure1001M | | | | | | | | |
| Solvent | DEDG | | | | | | | | |
| | BDGAC | | | | | | | | |
| Inhibitor | Phenothiazine | 0.1 | 0.1 | 0.1 | 0.1 | 0.1 | 0.1 | 0.1 | 0.1 |
| Additive | TegoGlide450 | 0.5 | 0.5 | 0.5 | 0.5 | 0.5 | 0.5 | 0.5 | 0.5 |
| | Total | 100 | 100 | 100 | 100 | 100 | 100 | 100 | 100 |
| | Average absorbance at 320-380 nm | 0.88 | 0.46 | 0.51 | 0.73 | 0.88 | 0.46 | 0.51 | 0.73 |
| Proportion | Pigment | 2.6% | 4.0% | 4.0% | 2.0% | 2.6% | 4.0% | 4.0% | 2.0% |
| | VEEA | 35.0% | 35.0% | 35.0% | 35.0% | 64.0% | 64.0% | 64.0% | 64.0% |
| | DPGDA | 52.3% | 51.6% | 49.4% | 52.6% | 23.3% | 22.6% | 20.4% | 23.6% |

TABLE 5

| | | \multicolumn{8}{c}{Ink} | | | | | | | |
|---|---|---|---|---|---|---|---|---|
| | Raw material | C12 | M12 | Y12 | K12 | C13 | M13 | Y13 | K13 |
| Dispersion | 1 | | | | | | | | |
| | 2 | 13 | | | | 13 | | | |
| | 3 | | | | | | | | |
| | 4 | | 30 | | | | 30 | | |
| | 5 | | | | | | | | |
| | 6 | | | | | | | | |
| | 7 | | | 20 | | | | 20 | |
| | 8 | | | | | | | | |
| | 9 | | | | 10 | | | | 10 |
| Monomer | VEEA | 57.4 | 52.4 | 54 | 57.4 | 21.4 | 24.4 | 18 | 21.4 |
| | DPGDA | 20 | 9 | 16 | 23 | 56 | 37 | 52 | 59 |
| | TPGDA | | | | | | | | |
| | PEA | | | | | | | | |
| | DDDA | | | | | | | | |
| Initiator | EAB | 3 | 2 | 2 | | 3 | 2 | 2 | |
| | Irgacure369 | 3 | | | 3 | 3 | | | 3 |
| | Irgacure379 | | 3 | 3 | | | 3 | 3 | |
| | TPO | 3 | | 4.4 | 3 | 3 | | 4.4 | 3 |
| | Irgacure819 | | 3 | | 3 | | 3 | | 3 |
| | DETX | | | | | | | | |
| | Esacure1001M | | | | | | | | |
| Solvent | DEDG | | | | | | | | |
| | BuCBAc | | | | | | | | |
| Inhibitor | Phenothiazine | 0.1 | 0.1 | 0.1 | 0.1 | 0.1 | 0.1 | 0.1 | 0.1 |
| Additive | TegoGlide450 | 0.5 | 0.5 | 0.5 | 0.5 | 0.5 | 0.5 | 0.5 | 0.5 |
| | Total | 100 | 100 | 100 | 100 | 100 | 100 | 100 | 100 |
| | Average absorbance at 320-380 nm | 0.88 | 0.69 | 0.51 | 0.73 | 0.88 | 0.69 | 0.51 | 0.73 |
| Proportion | Pigment | 2.6% | 6.0% | 4.0% | 2.0% | 2.6% | 6.0% | 4.0% | 2.0% |
| | VEEA | 57.4% | 52.4% | 54.0% | 57.4% | 21.4% | 24.4% | 18.0% | 21.4% |
| | DPGDA | 29.4% | 30.6% | 30.4% | 30.2% | 65.4% | 58.6% | 66.4% | 66.2% |

The ink compositions or ink sets were used as Examples 1 to 7 and Comparative Examples 1 to 6, and subjected to various evaluations. The evaluation items and the overview are as described below. The evaluation results are shown in Tables 6 (Examples) and Table 7 (Comparative Example).

(Evaluation of Ejection Properties)

The behavior of ink ejection from a head (KJ4A) manufactured by Kyocera Corporation was observed by strobe photographing, thereby evaluating the ejection properties. The waveform was Fire1 mode. In the evaluation, the behavior of breakage of droplets after continuous ejection for 10 minutes at the frequency of 20 kHz was observed. The conditions of the droplets at the points of 1 mm and 2 mm after ejection were observed. The droplets are preferably stable and not broken. As described below, the results were evaluated in three grades, and those rated as ◯ or higher were judged as having practical ejection properties.

⊙: Droplets are continuous and not broken up to 2 mm; stable.

◯: Droplets are broken at 1 mm, but united at 2 mm; or the state of rupture is markedly changed from the initial stage.

X: Droplets are broken at 1 mm, and do not unite even at 2 mm; ejection failure occurs in the initial stage or after the lapse of 10 minutes.

Tables 6 and 7 list the evaluations of the colors having the lowest grade among the ink compositions of each color.

(Evaluation of Printed Material)

The prepared inks were evaluated at a droplet amount of 14 pl using a single-pass inkjet printer (manufactured by Trytek Co., Ltd.) including an ejection mechanism equipped with a head (KJ4A) manufactured by Kyocera Corporation, a mechanism carrying the printed base material at a desired speed on a conveyor, and then a mechanism of irradiating with a UV lamp. The UV lamp used for the evaluation was a metal halide lamp of 160 W/cm, manufactured by Nordson KK. The head temperature during ejection was kept at 40° C. The printed materials were evaluated for curability, the concentration of the printed material, color reproduction, and residual rate.

(Curability)

Magenta ink, yellow ink, cyan ink, and black ink were printed in a 100% solid state on PET K2411 (manufactured by Lintec Corporation) as the printing base material at a conveyor speed of 25 and 50 m/min, and the curability was judged by finger touch. As described below, the results were evaluated respectively in three grades, and those rated as ⊙ or higher were judged as having practical curability. Tables 6 and 7 list the evaluations of the colors having the lowest grade.

⊙: Cured at 50 m/min, and no bleeding occurs even by strong rubbing.

◯: Cured at 25 m/min, no bleeding occurs even by strong rubbing, but bleeding occurs at 50 m/min.

X: Not cured even at 25 m/min; bleeding occurs, or ink adheres to the finger by strong rubbing.

(Concentration of Printed Material)

Printing was carried out by using OK Topcoat N (manufactured by Oji Paper Co., Ltd.) as the printing base material at a conveyor speed of 25 m/min. The solid print area of each color at a printing ratio of 100% on the printed materials for evaluation thus obtained was measured for the concentration (optical density) using a densitometer (X-RITE 938 manufactured by X-Rite Inc.). The results were evaluated in comparison with the concentration defined by the standard printing color characteristic value of Japan Color 2007 for Sheet-Feed Printing (coated paper C/M/Y/K=1.50/1.47/1.04/1.76). Those rated as ◯ or higher were judged as having a practical concentration. Tables 6 and 7 list the evaluations of the colors having the lowest grade.

◯: Equivalent to or higher than the designated concentration.

X: Lower than the designated concentration.

(Color Reproduction)

For the magenta ink, the yellow ink, and the cyan ink, the hue obtained by overlapping printing of the magenta ink 100% solid+the yellow ink 100% solid was defined as the red region, the hue obtained by overlapping printing of the magenta ink 100% solid+the cyan ink 100% solid was defined as the blue region, and the hue obtained by overlapping printing of the yellow ink 100% solid+the cyan ink 100% solid was defined as the green region. The magenta ink, the yellow ink, and the cyan ink were printed with 100% solid infill, and these regions were defined as magenta region, yellow region, and cyan region, respectively. Using PET K2411 (manufactured by Lintec Corporation) as the printing base material, and printing was carried out at a conveyor speed of 25 m/min. The resulting printed material was measured for the L*a*b*value using a spectroscopic colorimeter X-RITE 528, with a light source D50 and a viewing angle of 2°. The regions of red, magenta, blue, cyan, green, and yellow were evaluated based on whether the color reproduction $C=\sqrt{(a^{*2}+b^{*2})}$, which is the degree of brightness in the numerical form, is higher and located outside of each gamut, in comparison with Japan color 2007 and FOGRA39, which is the European color standard. Those rated as ◯ or higher were judged as at the practical level of color reproduction.

◯: In all the regions, color reproduction is higher than Japan Color 2007 and FOGRA39, and located outside of each gamut.

X: In any of the above-described regions, color reproduction is lower than Japan Color 2007 and FOGRA39, and located inside of gamut.

(Residual Rate: Extraction and Calculation of Amount of Unreacted Monomers, Initiator, and Other Components Remaining in the Cured Film)

Using PET K2411 (manufactured by Lintec Corporation) as the printing base material, the magenta ink, the yellow ink, the cyan ink, and the black ink were printed with 100% solid infill at a conveyor speed of 25 m/min. The cured film was cut into a 10-cm square together with the base material, soaked in 1000 mL of methyl ethyl ketone contained in a sealed container for 3 days at 60° C., thereby extracting the residual components from the cured film of each color. After a lapse of two days, methyl ethyl ketone homogenized by stirring was taken out from the container, and the extracted components were identified by GCMS (GCMS-QP2010 Plus, manufactured by Shimadzu Co., Ltd.) and HPLC (manufactured by Shimadzu Co., Ltd.). The calibration curves of the detected compounds were prepared to determine the compounds, thereby calculating the amounts of the unreacted monomers, initiator, and other components remaining in the cured film.

The weight of the cured film was calculated as follows.

Weight of cured film=Weight of printed material after printing (cured film+base material)−weight of base material before printing.

(Residual Rate of Monomer)

The residual rate of the unreacted monomer remaining tin the cured film was calculated as follows.

Residual rate of monomers (%)=(total amount of extracted monomers (g)/cured film weight (g))×100

(Residual Rate of Initiator)

The residual rate of the unreacted initiator remaining in the cured film was calculated as follows.

Residual rate of initiator (%)=(total amount of extracted initiator (g)/cured film weight (g))×100

(Residual Rate of Others)

The residual rate of the other components remaining in the cured film was calculated as follows.

Residual rate of others (%)={(total amount of extracted compounds (g)−total amount of extracted monomers (g)−total amount of extracted initiator (g)}/cured film weight (g))×100

As a result of the evaluation of each raw material as the printed material for food packaging in accordance with EUPIA guidance (EUPIA Guideline on Printing Inks applied to the non-food contact surface of food packaging materials and articles), in order to fall short of the lower limit of the migration value into the food substitute evaluation liquid, the criterion is satisfied when the residual amounts of the monomers, initiator, and other components remaining in the cured product must be the certain value or lower. On the basis of the result, in the present invention, the residual level was evaluated in the following three grades, and those rated as ○ or higher were judged as at the practical level of residual rate. Tables 6 and 7 list the evaluations of the colors having the lowest grade.

(Residual Rate of Monomer)
⊙: 0.1% or less
○: More than 0.1% and 0.5% or less
X: More than 0.5%
(Residual Rate of Initiator)
⊙: 2% or less
○: More than 2% and 6% or less
X: More than 6%
(Residual Rate of Other Components)
⊙: 0.1% or less
○: More than 0.1% and 0.5% or less
X: More than 0.5%

TABLE 6

| | | Example 1 | Example 2 | Example 3 | Example 4 | Example 5 | Example 6 | Example 7 |
|---|---|---|---|---|---|---|---|---|
| Ink | Cyan | C1 | C2 | C3 | C4 | C5 | C6 | C7 |
| | Magenta | M1 | M2 | M3 | M4 | M5 | M6 | M7 |
| | Yellow | Y1 | Y2 | Y3 | Y4 | Y5 | Y6 | Y7 |
| | Black | K1 | K2 | K3 | K4 | K5 | K6 | K7 |
| Evaluation | Ejection properties | ○ | ⊙ | ○ | ⊙ | ○ | ○ | ○ |
| | Curing properties | ○ | ⊙ | ⊙ | ⊙ | ○ | ⊙ | ○ |
| | Concentration | ○ | ○ | ○ | ○ | ○ | ○ | ○ |
| | Color reproduction | ○ | ○ | ○ | ○ | ○ | ○ | ○ |
| Residual rate | Monomer | ○ | ⊙ | ⊙ | ⊙ | ○ | ⊙ | ○ |
| | Initiator | ⊙ | ⊙ | ⊙ | ○ | ○ | ⊙ | ⊙ |
| | Others | ○ | ⊙ | ⊙ | ○ | ○ | ⊙ | ○ |

TABLE 7

| | | Comparative Example 1 | Comparative Example 2 | Comparative Example 3 | Comparative Example 4 | Comparative Example 5 | Comparative Example 6 |
|---|---|---|---|---|---|---|---|
| Ink | C | C8 | C9 | C10 | C11 | C12 | C13 |
| | M | M8 | M9 | M10 | M11 | M12 | M13 |
| | Y | Y8 | Y9 | Y10 | Y11 | Y12 | Y13 |
| | K | K8 | K9 | K10 | K11 | K12 | K13 |
| Evaluation | Ejection properties | ○ | ○ | X | X | X | X |
| | Curing properties | ○ | ⊙ | ○ | ○ | ○ | ○ |
| | Concentration | ○ | X | ○ | ○ | ○ | ○ |
| | Color reproduction | ○ | X | ○ | ○ | ○ | ○ |
| Residual rate | Monomer | X | ⊙ | X | X | X | X |
| | Initiator | X | ⊙ | X | X | X | X |
| | Others | X | ⊙ | X | X | X | X |

Examples 1 to 7 showed good residual rates, curability, ejection properties, color reproduction, and concentrations, and provide single-pass curable inks suitable for labels for food and cosmetics. In Examples 2, 3, 4, and 6, the residual rate of monomers is further low, and in Examples 1, 2, 3, 6, and 7, the residual rate of initiator was further reduced. Furthermore, in Examples 2, 3, and 6, the total residual rate in the cured film printed at 25 m/min was further lower, the ink thus obtained was a single-pass curable ink useful for safe and secure labels including labels for pharmaceutical products. In Examples 2 and 4, ejection properties were good owing to inclusion of a small amount of solvent, and stable ejection was achieved at a high frequency. Therefore, the inks are expected to achieve stable production under high speed printing for a long term.

On the other hand, in Comparative Example 1, the amount of the pigment blending quantity was high, so that the lamp energy was absorbed in the pigment, and the pigment inhibits curing reaction of the initiator and monomers, so that curing through the deep portion of the cured film was insufficient. Therefore, in the evaluation of curability, the surface of the cured film was cured, and curing of the cured film was apparently sufficient, but all the residual rates were detected at very high values, and the single-pass curable ink and ink set were not usable as labels for food, cosmetics, and pharmaceutical products. In Comparative Examples 3 to 6, the surface of the cured film was apparently cured in the evaluation of curability and seemed to be sufficient, but all the residual rates were detected at very high values because of the uneven blending quantitys of 2-(2-vinyloxyethoxy) ethyl acrylate and dipropylene glycol diacrylate, so that the single-pass curable ink and ink set were not usable as labels for food, cosmetics, and pharmaceutical products. In Comparative Example 2, the high speed curability and residual rate were good, but the pigment concentration was too low, so that the color reproduction and concentration were not sufficient for the use for labels.

The invention claimed is:

1. An ink set comprising at least a magenta ink composition, a yellow ink composition and a black ink composition, wherein
each of the magenta ink composition, the yellow ink composition and the black ink composition is an active energy ray-curable inkjet ink composition comprising at least monomers having at least one of an ethylene oxide skeleton and a propylene oxide skeleton including at least 2-(2-vinyloxyethoxy)ethyl acrylate and dipropylene glycol diacrylate, a pigment and an initiator, wherein
a content of 2-(2-vinyloxyethoxy)ethyl acrylate is 40 to 65% by weight in a total weight of the ink composition, and a content of dipropylene glycol diacrylate is 31 to 63% by weight in the total weight of the ink composition, and wherein the initiator in the magenta ink composition at least includes 2-(dimethylamino)-2-[(4-methylphenyl)methyl]-1-[4-(4-morpholinyl)phenyl]-1-butanon e and bis(2,4,6-trimethylbenzoyl)-phenylphosphine oxide, and a content of the pigment is 1 to 8.6% by weight in the total weight of the magenta ink composition, the initiator in the yellow ink composition includes two or more compounds selected from the group consisting of 4,4'-bis-(dimethylamino)benzophenone, 2-benzyl-2-dimethylamino-1-(4-morpholinophenyl)-butane-1-one, 2-(dimethylamino)-2-[(4-methylpheny)methyl]-1-[4-(4-morpholinyl)phenyl]-1-butanon e, 2,4,6-trimethylbenzoyl-diphenylphosphine oxide, and bis(2,4,6-trimethylbenzoyl)-phenylphosphine oxide, wherein one of the two or more compounds is 2-(dimethylamino)-2-[(4-methylphenyl)methyl]-1-[4-(4-morpholinyl)phenyl]-1-butanon e, and a content of the pigment is 1 to 7.5% by weight in the total weight of the yellow ink composition, and the initiator in the black ink composition includes two or more compounds selected from the group consisting of 4,4'-bis-(dimethylamino)benzophenone, 2-benzyl-2-dimethylamino-1-(4-morpholinophenyl)-butane-1-one, 2-(dimethylamino)-2[(4-methylphenyl)methyl]-1-[4-(4-morpholinyl)phenyl]-1-butanon e, 2,4,6-trimethylbenzoyl-diphenylphosphine oxide, and bis(2,4,6-trimethylbenzoyl)-phenylphosphine oxide, wherein one of the two or more compounds is bis(2,4,6-trimethylbenzoyl)-phenylphosphine oxide, and a content of the pigment is 1 to 2.7% by weight in the total weight of the black ink composition.

2. The ink set of claim 1, wherein an amount of the initiator is 10% by weight or less in the total weight of the ink composition.

3. The ink set of claim 1, wherein a content of the monomers having at least one of an ethylene oxide skeleton and a propylene oxide skeleton is 90% by weight or more in a total monomer amount in the active energy ray-curable inkjet ink composition.

4. The ink set of claim 1, wherein the two or more ink compositions are each a single-pass curable active energy ray-curable inkjet ink composition.

5. The ink set of claim 1, further comprises a cyan ink composition, wherein the cyan ink composition is an active energy ray-curable inkjet ink composition comprising at least monomers having at least one of an ethylene oxide skeleton and a propylene oxide skeleton including at least 2-(2-vinyloxyethoxy)ethyl acrylate and dipropylene glycol diacrylate, a pigment and an initiator, wherein a content of 2-(2-vinyloxyethoxy)ethyl acrylate is 40 to 65% by weight in a total weight of the ink composition, and a content of dipropylene glycol diacrylate is 31 to 63% by weight in the total weight of the ink composition, and a content of the pigment is 1 to 2.9% by weight in the total weight of the cyan ink composition.

6. The ink set of claim 1, wherein the magenta ink composition comprises a pigment selected from the group consisting of C.I. Pigment Red 122, C.I. Pigment Red 184, C.I. Pigment Red 185, C.I. Pigment Red 202, C.I. Pigment Red 208, C.I. Pigment Red 245, and C.I. Pigment violet 19, the yellow ink composition comprises a pigment selected from the group consisting of C.I. Pigment Yellow 74, C.I. Pigment Yellow 120, C.I. Pigment Yellow 138, C.I. Pigment Yellow 139, C.I. Pigment Yellow 150, C.I. Pigment Yellow 151, C.I. Pigment Yellow 155, C.I. Pigment Yellow 180, C.I. Pigment Yellow 185, and C.I. Pigment Yellow 213, and the black ink composition comprises C.I. Pigment Black 7.

7. The ink set of claim 5, wherein the cyan ink composition comprises a pigment selected from the group consisting of C.I. Pigment Blue 15:3, C.I. Pigment Blue 15:4, and C.I. Pigment Blue 15:6, the magenta ink composition comprises a pigment selected from the group consisting of C.I. Pigment Red 122, C.I. Pigment Red 184, C.I. Pigment Red 185, C.I. Pigment Red 202, C.I. Pigment Red 208, C.I. Pigment Red 245, and C.I. Pigment violet 19, the yellow ink composition comprises a pigment selected from the group consisting of C.I. Pigment Yellow 74, C.I. Pigment Yellow 120, C.I. Pigment Yellow 138, C.I. Pigment Yellow 139, C.I. Pigment Yellow 150, C.I. Pigment Yellow 151, C.I. Pigment Yellow 155, C.I. Pigment Yellow 180, C.I. Pigment Yellow 185, and C.I. Pigment Yellow 213, the black ink composition comprises C.I. Pigment Black 7.

8. The ink set of claim 7, wherein the cyan ink composition comprises a pigment selected from the group consisting of C.I. Pigment Blue 15:3, and C.I. Pigment Blue 15:4, the magenta ink composition comprises a pigment selected from the group consisting of C.I. Pigment Red 122, C.I. Pigment Red 202, and C.I. Pigment violet 19, and the yellow ink composition comprises a pigment selected from the group consisting of C.I. Pigment Yellow 150, C.I. Pigment Yellow 180, and C.I. Pigment Yellow 185.

9. The ink set of claim 1, wherein the initiator in the magenta ink composition further includes one or more compounds selected from the group consisting of 4,4'-bis-(dimethylamino)benzophenone, 2-benzyl-2-dimethylamino-1-(4-morpholinophenyl)-butane-1-one and 2,4,6-trimethylbenzoyl-diphenylphosphine oxide.

10. The ink set of claim 1, wherein the yellow ink composition comprises C.I. Pigment Yellow 185.

* * * * *